United States Patent

[11] 3,544,098

| [72] | Inventors | George F. Hawley<br>Bogota, New Jersey;<br>John H. Buettner, Williston, Vermont |
|---|---|---|
| [21] | Appl. No. | 475,986 |
| [22] | Filed | July 30, 1965 |
| [45] | Patented | Dec. 1, 1970 |
| [73] | Assignee | Ivanhoe Research Corporation<br>New York, New York<br>a corporation of Delaware. by mesne<br>assignment |

[54] METHODS AND APPARATUS FOR AUTOMATICALLY TRANSFERRING AND REGISTERING FABRIC WORKPIECES
27 Claims, 20 Drawing Figs.

| [52] | U.S. Cl. | 270/58;<br>112/2; 271/58 |
|---|---|---|
| [51] | Int. Cl. | B65h 39/02,<br>B65h 9/00 |
| [50] | Field of Search | 270/58, 59,<br>1; 112/102(D), 2; 271/60, 58, 52, 53 |

[56] References Cited
UNITED STATES PATENTS

| 458,945 | 9/1891 | Crane et al. | 271/52 |
| 2,757,928 | 8/1956 | Thomas | 271/52X |
| 2,953,372 | 9/1960 | Williams et al. | 271/52 |
| 3,072,397 | 1/1963 | Kelchner | 271/53 |
| 3,122,295 | 2/1964 | Davison et al. | 226/97 |
| 3,178,174 | 4/1965 | Schneider | 271/46 |
| 3,298,682 | 1/1967 | Gatti | 271/53 |

FOREIGN PATENTS

| 468,077 | 11/1928 | Germany | 271/52 |

*Primary Examiner*—Eugene R. Capozio
*Assistant Examiner*—Paul V. Williams
*Attorney*—Robertson, Smythe, Bryan & Parmelee ABSTRACT: Methods and apparatus for automatically transferring and registering fabric workpieces and for combining them, including means for moving the fabric workpieces over a supporting surface upon which they can be slid, means for impelling one or more of their edges outwardly against one or more stop surfaces in known positions to register the workpieces with respect to the positions of the stop surfaces, and means for maintaining the known orientation and relationship relative to the other workpieces during the subsequent transfer of the workpieces following registration and during the combining thereof.

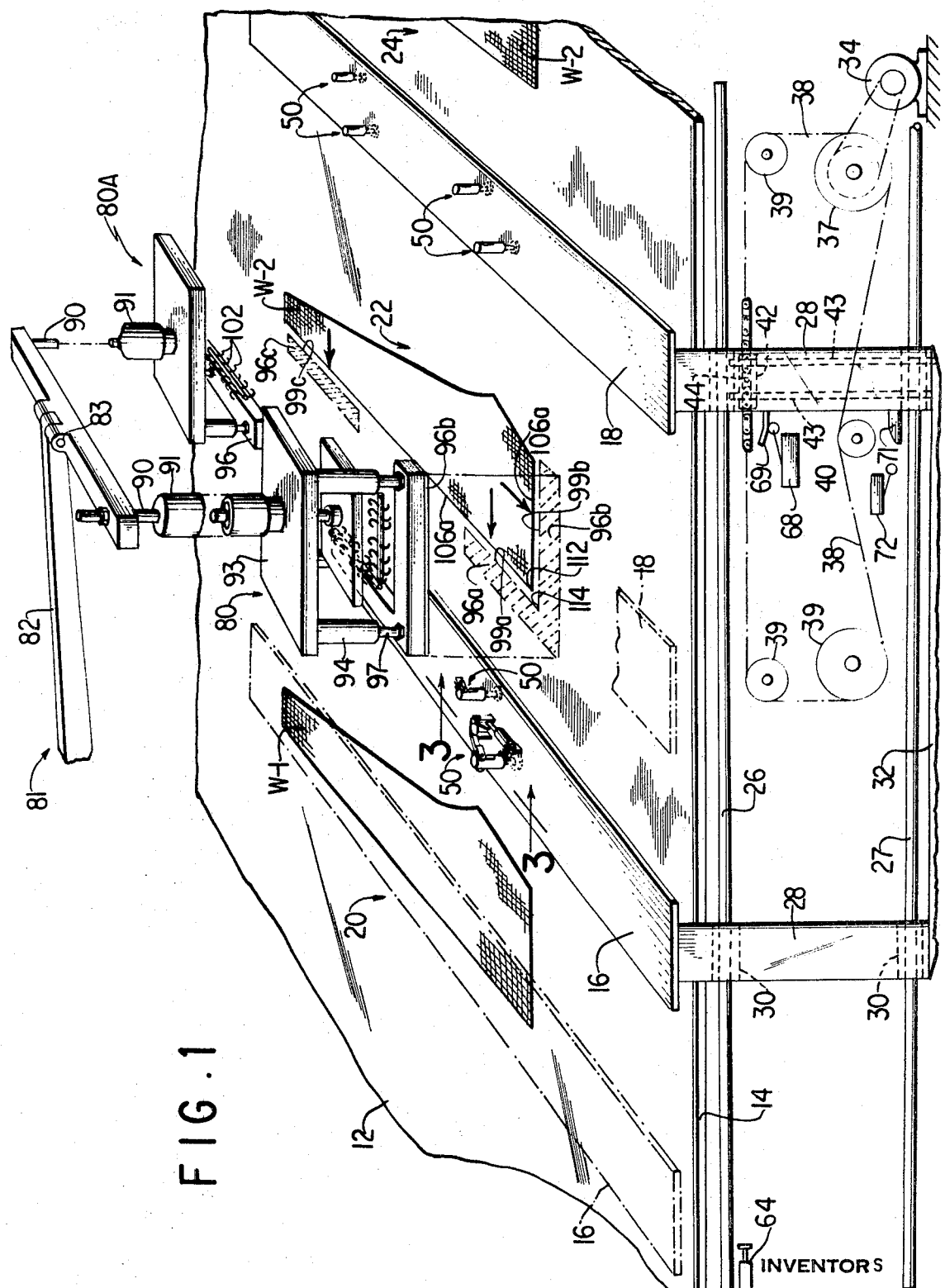

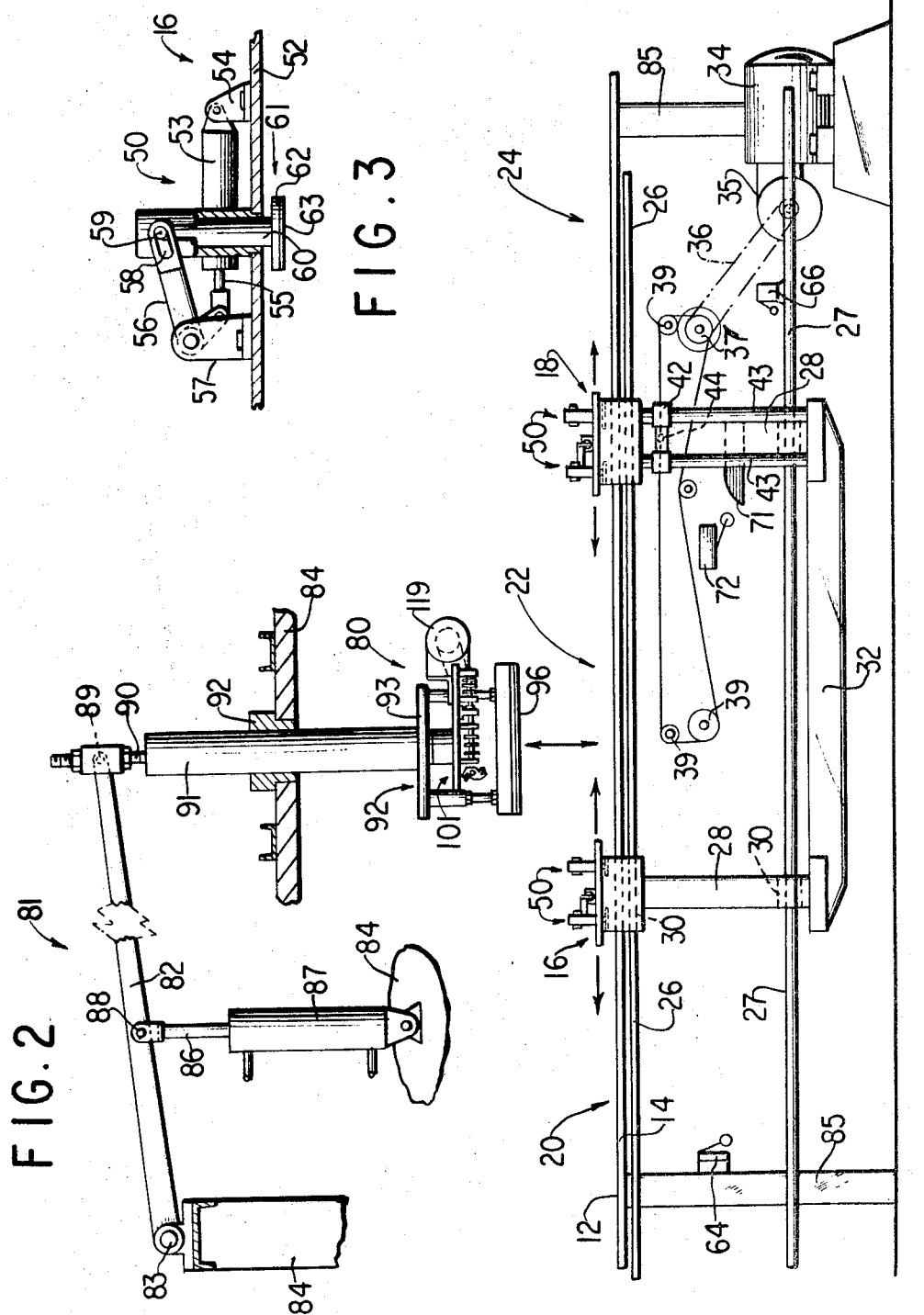

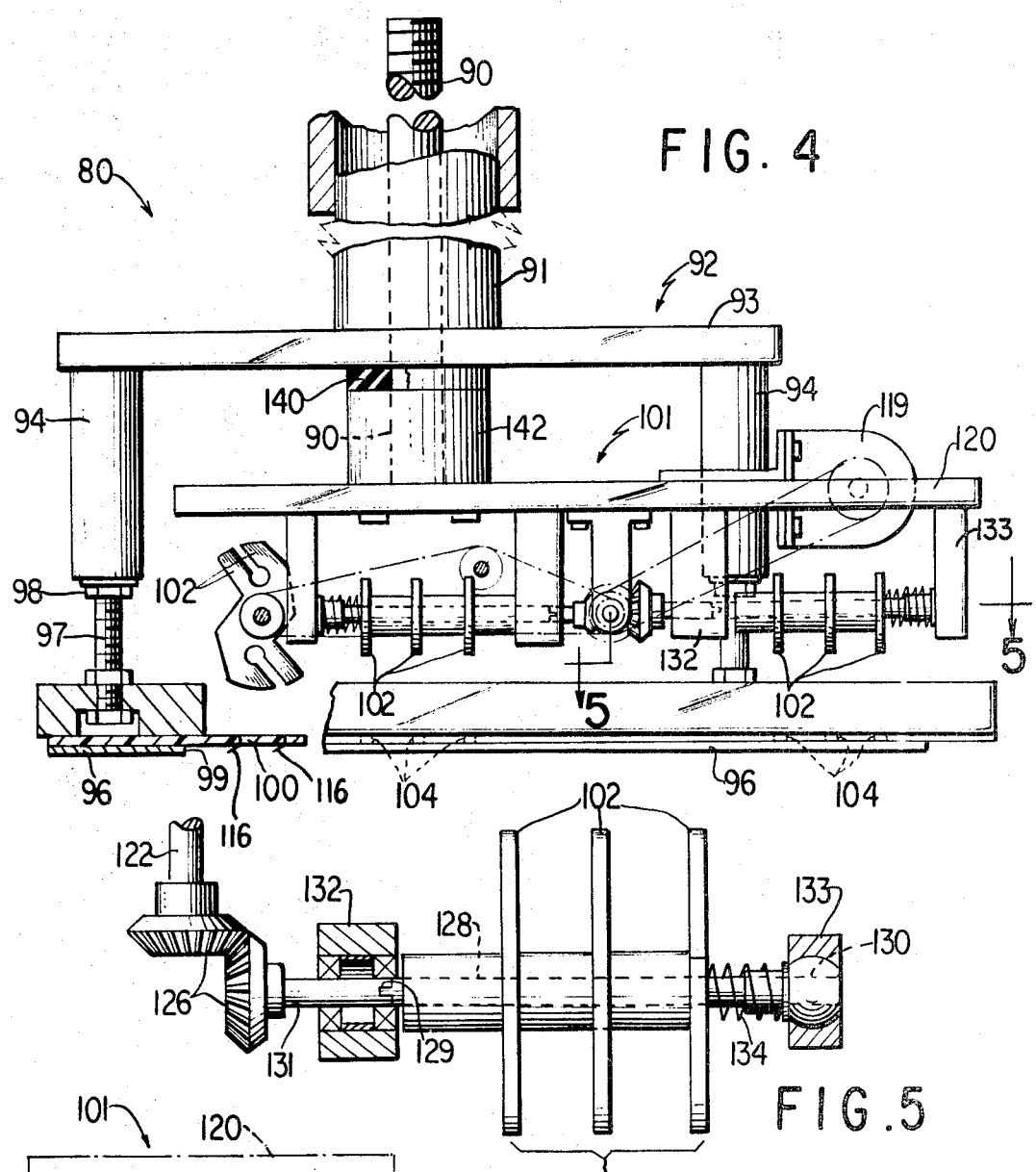

Patented Dec. 1, 1970 3,544,098

INVENTORS
GEORGE F. HAWLEY
JOHN H. BUETTNER
BY
Robertson, Smythe, Bryant Parmelee
ATTORNEYS

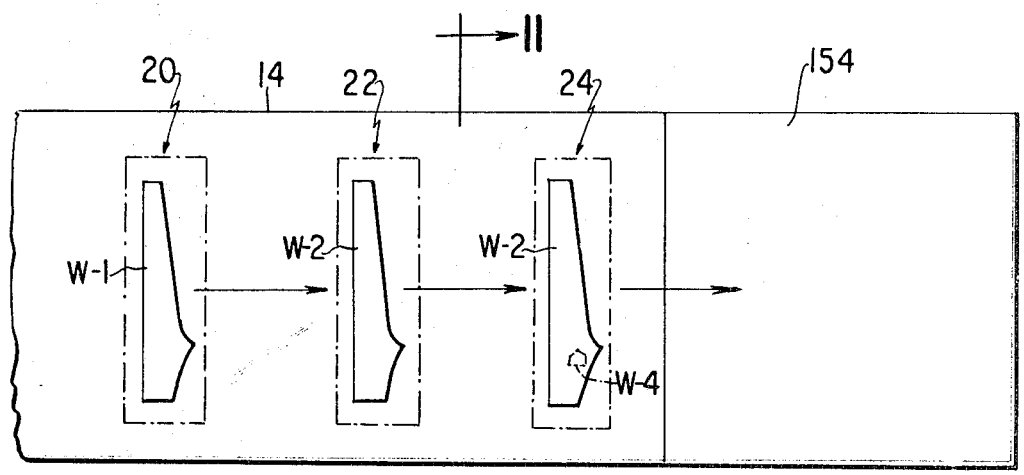
FIG.10
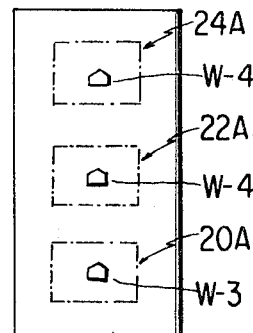
FIG.11
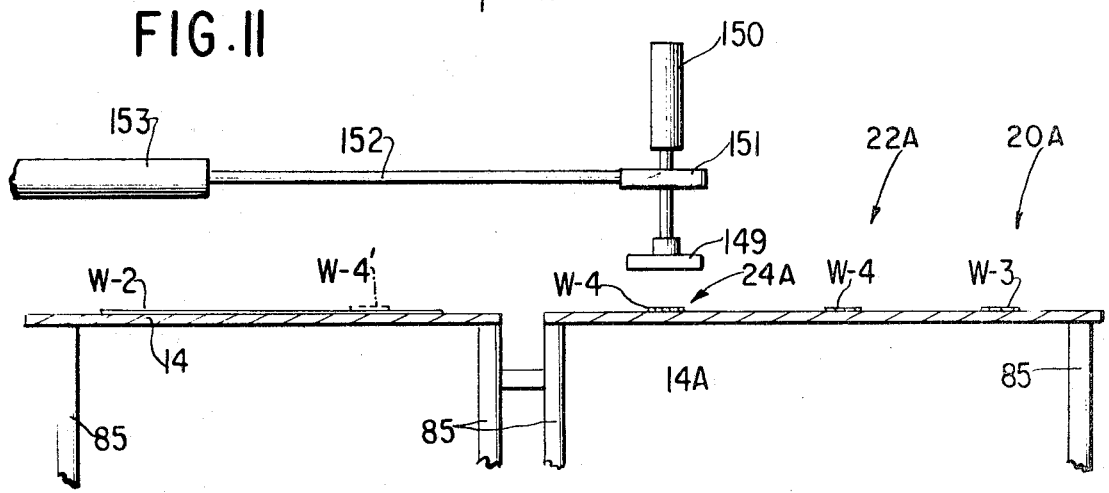

INVENTORS
GEORGE F. HAWLEY
JOHN H. BUETTNER
BY
Robertson, Smythe, Bryan & Parmelee
ATTORNEYS

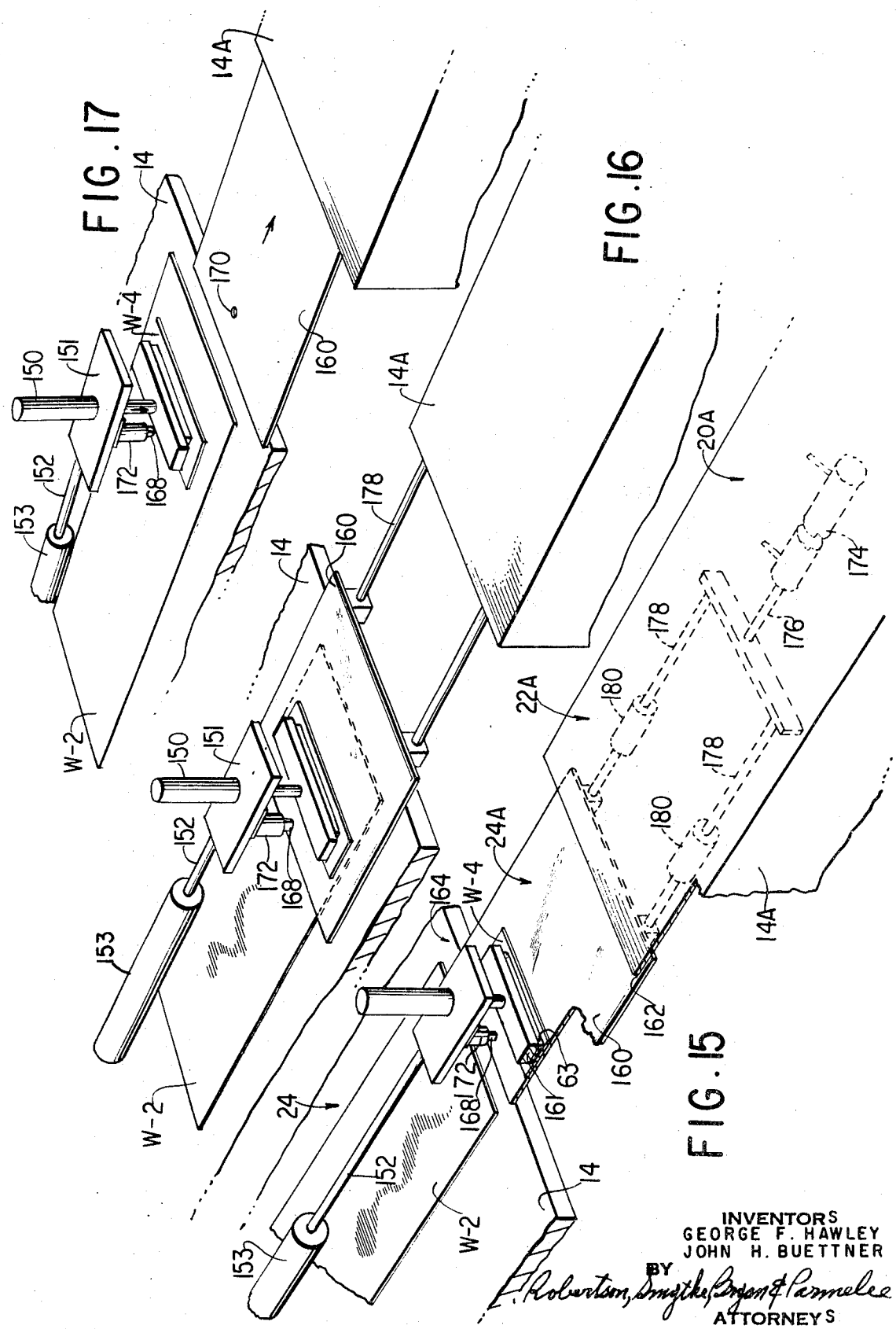

Patented Dec. 1, 1970

INVENTORS
GEORGE F. HAWLEY
JOHN H. BUETTNER
BY
Robertson, Smythe, Bryson & Parmelee
ATTORNEYS

METHODS AND APPARATUS FOR AUTOMATICALLY TRANSFERRING AND REGISTERING FABRIC WORKPIECES

The present invention relates to methods and apparatus for transferring and registering fabric workpieces and for combining them, and more particularly to such methods and apparatus for accomplishing the transfer and registration of fabric workpieces and for combining them completely automatically in readiness for fastening together.

These transfer and registration and combining methods and apparatus are intended for use in automatic production systems for manufacturing fabric goods such as clothing, headgear, footgear and the like, including subassemblies of such goods. At the present time the garment industry is characterized by substantial amounts of tedious, repetitious, monotonous hand labor in producing finished goods. The present invention is intended for use in this field to enable machinery to be used to relieve human beings of the need to perform much of this drudgery.

This invention is visualized by us as providing fundamental and widely applicable methods and apparatus by the use of which the apparel industry will be enabled to set up many different types and arrangements of fully and partially automatic production lines. The transfer and registration methods and apparatus embodying this invention are very flexible in application and are adapted for handling a wide variety of types and sizes of fabric goods. This invention is visualized by us as providing fundamental building blocks for setting up fully and partially automatic production lines in the apparel industry, being used between or in connection with successive stages or stations of an automatic manufacturing line for transferring separate fabric pieces or semifinished workpieces from one station or stage to the next successive station or stage of the production line, for bringing them into registration and for combining them together in proper accurate relationships for subsequent fastening.

When utilized in production systems for manufacturing fabric goods such as clothing, headgear, footgear and the like, the present invention enables each individual fabric workpiece to be brought automatically into a very accurately known relationship with respect to other workpieces and with respect to various operating parts of the equipment, for example, such as folding means, fastening means including needles, etc. so that these workpieces can be properly assembled automatically in readiness to be secured together to provide the desired shape and size in the end product. For example, the assembled multiple workpieces of fabric are in readiness subsequently to be fastened together as by sewing to complete the product.

In our endeavors to handle and assemble pieces of fabric automatically, we have found that the problems of transferring and registering the fabric workpieces have been very difficult to solve. The characteristics of the typical piece of cloth such as those from which many types of garments and head and foot coverings are made are limpness, flexibility including flexibility in shear, i.e. it will distort readily in the bias direction, and generally irregular outlines. In addition, the cut edge of a piece of cloth is markedly textured and includes minute projecting fibers which produce a strong frictional grip upon other pieces of fabric when they are in contact one with another, especially when the fibers of cut edges are in contact one with another.

In our experience these characteristics of fabric workpieces set them apart uniquely and entirely from the types of sheet articles which are now quite commonly registered by machinery during their handling in other fields. For example, sheets of paper are now usually automatically registered during their feeding into printing presses or into business machines. As other examples, it is noted that metal sheets and plastic sheets are often registered when being fed into stamping, pressing or cutting machinery. We have found that the methods and apparatus of these paper, plastic, and metal handling arts are not applicable in the present field of automatically transferring and registering fabric workpieces and of combining them. The reader may personally have registered two or more paper sheets one with another by gently jogging their edges against the top of a desk or table. The reader is asked to visualize the problem of similarly trying to register two or more pieces of irregularly shaped fabric, such as panels of a man's cotton shirt, except by picking one up, turning it and carefully laying it down upon the other with their corresponding edges in registration.

It is an object of the present invention to overcome these problems by providing transfer and registration methods and apparatus and combining methods and apparatus which are widely applicable in the garment industry and similar fabric goods producing industries for transferring and registering fabric workpieces and for combining them at various stations and stages of a production line.

In accordance with the transfer and registration methods and apparatus and the combining methods and apparatus embodying the present invention the fabric workpieces are moved over a supporting surface upon which they can be slid, and one or more of their edges are impelled outwardly against one or more stop surfaces in know positions to register the workpieces with respect to the positions of the stop surfaces. During transfer of the workpieces following registration and during combining their known orientation and relationship to other workpieces is advantageously maintained.

As used herein the term "workpiece" is intended to include individual pieces as well as subassemblies or semifinished goods including two or more pieces or components secured together by suitable fastening, such as by sewing. The term "fabric" is intended to include woven goods and also nonwoven or felted or perforate goods having a fabriclike texture suitable for use in clothing, headgear and similar uses, regardless of whether the material of the goods is in one layer or multiple layers and regardless of whether the goods are natural, synthetic, or blended.

The term "registration" or "registering" is intended to mean the bringing of a fabric workpiece into a very accurately known position and orientation with respect to one or more reference elements whose position and orientation in the equipment is precisely known. These reference elements are specifically called "stop surfaces" in the illustrative examples of this invention. When two workpieces have each been registered at different regions in the system, then, since the position and orientation of each one is now known, the position and orientation of each one with respect to the other is also known. This permits them to be brought together in proper relationship for assembly and fastening, as by sewing.

The term "transfer" or "transferring" is intended to mean the movement of a fabric workpiece from one region to a second region, while maintaining the workpiece in known relationship during this movement. In the illustrative examples shown herein the transfer is accomplished by bringing friction clamp feet elements down onto the workpiece from above and then sliding the workpiece along a smooth supporting surface from a first region to a second region and thereafter raising the clamp elements away from the workpiece. By registering the workpiece at the first region and then transferring it to the second region, its exact position and orientation at this second region are now known so that work can be automatically performed on it, for example fastening as by sewing.

The term "combining" is intended to mean the bringing together that is, the assembly, of two or more previously registered workpieces so that their positions and orientations remain known. Thus, the combined registered workpieces are ready for work automatically to be performed on them, for example, they are ready to be suitably fastened together, as by sewing them, cementing them, or fusing them together at one or more points.

In this specification and in the accompanying drawings are described and shown fully automatic transfer and registration methods and apparatus and combining methods and apparatus illustratively embodying the present invention, but it is to be understood that these examples are not intended to be exhaustive nor limiting of the invention. These illustrations are given so as to disclose the invention fully and clearly to those skilled in the art and so that the reader will appreciate how this invention can be adapted and modified in various forms, each as may be best suited for the conditions of a particular production line.

The various objects, aspects and advantages of the present invention will be more fully understood from a consideration of the following description in conjunction with the accompanying drawings, in which:

FIG. 1 is a perspective view illustrating transfer and registration methods and apparatus embodying the present invention;

FIG. 2 is a side elevational view of the apparatus of FIG. 1;

FIG. 3 is a partial sectional view taken along the line 3–3 of FIG. 1 and showing parts of the transfer arm apparatus;

FIG. 4 is an enlarged elevational view of the registration apparatus as seen in FIGS. 1 and 2;

FIG. 5 is a sectional view taken along the line 5–5 in FIG. 4 showing beating apparatus for impelling an edge portion of a fabric workpiece;

FIG. 6 is a plan view of beating apparatus and drive mechanism therefor;

FIG. 10 is a plan view of a transfer and registration system for combining or assembling two workpieces in a known relationship;

FIG. 11 is an elevational view of a portion of FIG. 10 as seen along the line 11–11;

FIGS. 15–17 are perspective views showing a sequence of operating positions of modified apparatus for combining a plurality of workpieces in known relationship;

Figure 7:
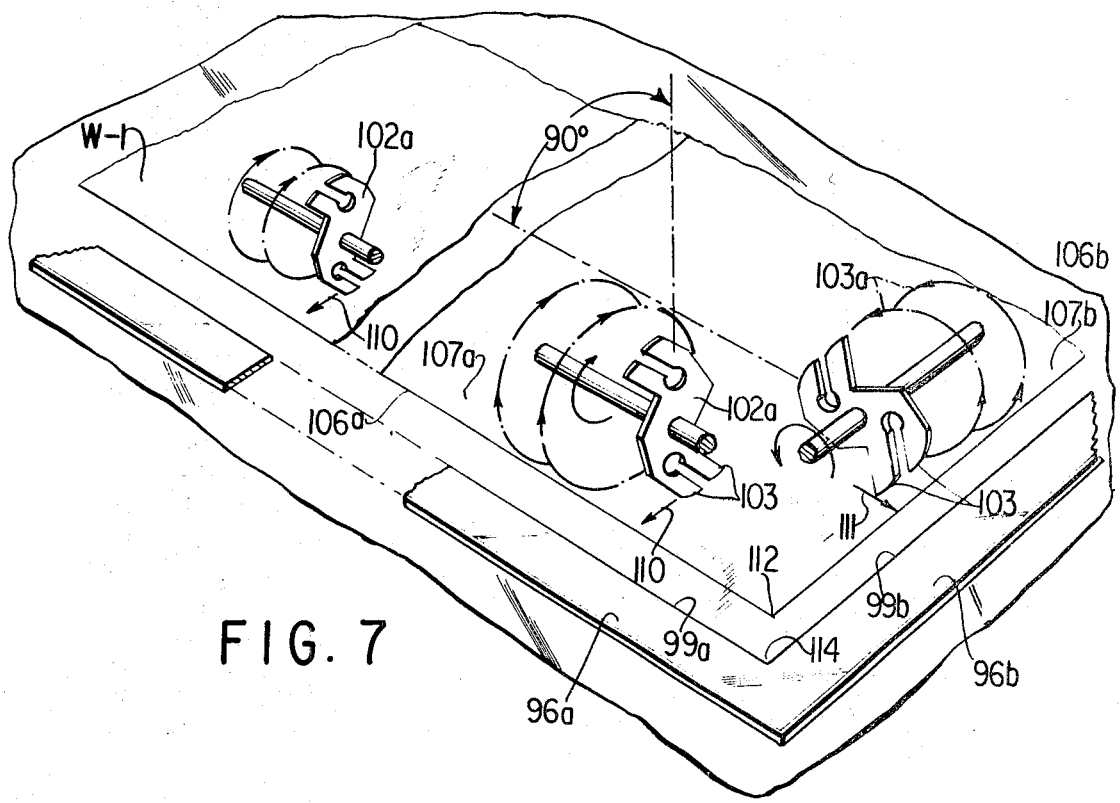
FIG. 7 is a perspective view illustrating the beating process impelling two edge portions of a fabric workpiece alternately in two different directions toward respective stop surfaces.

As shown in FIG. 1 the various fabric workpieces W are moved generally in a direction from left to right in the drawing over a low-friction supporting surface 12 provided by a large table 14 having a smooth upper surface, for example of polished metal, slippery plastic, or the like. Motion of a pair of transfer arms 16 and 18 toward the left is described as backward motion and toward the right as forward.

In operation a new fabric workpiece W-1 as indicated is delivered to a receiving region 20 which is located near the left or input end of the table 14. Then the workpiece W-1 is transferred to an intermediate region generally indicated at 22 in which it is brought into registration with respect to reference elements, as will be explained in detail further below. This registered workpiece is indicated by W-2, and it is then transferred to a region for work to be performed on it, for example, the workpiece is transferred from the registration region 22 to a combing region 24, while its precisely registered relationship is preserved.

At the combining area 24 the registered workpiece W-2 is combined with another registered workpiece W-4 (FIGS. 10 and 11) from another line. As an example, the registered piece W-2 may be a rear leg panel of a pair of trousers, and the other workpiece W-4 which is combined therewith may be a panel to form a hip pocket. By virtue of the fact that both workpieces have been precisely registered with respect to each other before they are combined, the pocket panel is correctly located on the leg panel in readiness to be automatically secured thereto subsequently, as by stitching.

The new fabric workpiece W-1 may be delivered manually or automatically to the receiving area 20. The location of the new workpieces W-1 when it is delivered to the receiving area 20, is not critical, for example, it may be askew or offset, or both, from a position which would correspond with a registered relationship, because it will subsequently be brought into registered relationship when it is in the registration area 22, as explained above.

In order to transfer the pieces W from one area to the next on the work surface 12, the transfer arms 16 and 18 are employed. These transfer arms are both guided by a pair of parallel guide rail rods 26 and 27 extending along one side of the line below the level of the workpiece supporting surface 12. A bracket member 28 is connected to the end of each transfer arm 16 and 18, and each bracket member 28 is carried by a pair of sleeve bearings 30 which are slidable along the respective rod rails 26 and 27. The two transfer arms are tied together so that they move in unison by means of a connecting link bar 32 (FIG. 2).

For driving the transfer arms, as is shown most clearly in FIG. 2, there is a transfer drive motor 34 connected to a speed-reducing gear mechanism 35 for driving a sprocket chain 36. This chain 36 in turn drives a sprocket 37 which engages a transfer traveller chain 38 passing in a generally rectangular path around three idler sprockets 39. A fourth idler sprocket 40 is movably mounted for adjusting the tension in the transfer traveller chain 38. As the traveller chain 38 moves along its rectangular path, it serves to move the transfer arms 16 and 18 forward and backward with a pause at each end of their strokes.

A slide block 42 is slidingly mounted on a pair of rods 43 which are rigidly connected to one of the arm brackets 28. A connecting pin 44 secures this block to one of the links of the traveller chain 38. Thus, the slide block 42 is forced to move with the chain 38. As the block 42 moves along the upper and lower parts of the generally rectangular path of chain 38, it causes the transfer arms to move backwardly and forwardly, respectively. As the block 42 moves up and down along the vertical end parts of the path of chain 38, it slides along the rods 43 while both transfer arms 16 and 18 are dwelling at the respective ends of their stroke. By this arrangement a smooth sinusoidal acceleration and deceleration is produced at each end of each stroke of the transfer arms as the pin 44 goes around the sprocket.

In FIGS. 1 and 2 the transfer arms 16 and 18 are shown in their rest position at the end of a transfer cycle. The initial motion of both arms is backward. The first arm 16 is moved by the chain 38 over to a first position above the receiving area 20 and at the same time the second arm 18 is moved over to a position above the registration area 22.

While the transfer arms are briefly dwelling in these respective positions, a plurality of clamping feet elements, as shown in detail in FIG. 3, are plunged down onto the respective workpieces W-1 and W-2. FIG. 3 illustrates one of the clamping feet and its operating means 50 on the arm 16. It will be understood that the structure of the other transfer arm and of other clamping feet on both arms is the same. The arm 16 includes a horizontal chassis member 52 carrying a double-acting pneumatic cylinder 53 mounted on a post 54. A piston rod 55 is connected to one end of a crank lever 56 which is pivoted on a post 57, and the upper end of this crank lever has a slot 58 engaging a pin 59 on a plunger 60. At the lower end of this plunger is a clamp foot 61 comprising a disc 62 covered by a resilient pad 63 of material providing a high frictional engagement with the workpieces being engaged, for example a thin sponge rubber pad. Air is suitably supplied to the cylinder 53 so that the piston rod 55 extends to swing the crank 56, plunging the clamp foot 61 down into firm frictional engagement with the piece W-1. The slot 58 provides clearance to accommodate the arcuate movement of the crank 56 relative to the reciprocating movement of the plunger shaft 60.

It is to be noted that the transfer arm moves over the workpiece and comes to a dead stop. Then, the friction clamp elements 61 come down perpendicular to the surface 12 into contact with the workpiece. After the friction clamp elements 61 are firmly pressing down onto the workpiece, then and only then, does the transfer arm again being moving.

The reason for explaining this explicitly is that if the downward motion of the friction clamp elements 61 should occur while the transfer arms are still in motion, the elements 61 would be descending along diagonal paths at the moment of contact with the workpiece. This diagonal downward movement could deregister the workpieces. The same is true when the friction clamp feet 61 are being lifted off of the workpiece after the transfer has occurred. Thus, the transfer arms are dead stopped and the clamp feet 61 are raised perpendicularly from the supporting surface 12.

The other clamp feet mechanisms 50 are similarly actuated so that the respective workpieces W-1 and W-2 are frictionally clamped to assure that these workpieces will be transferred with a movement exactly corresponding with the motion of the respective transfer arms 16 and 18.

There is a great differential in the coefficient of friction existing between the workpiece and supporting surface 12 (small coefficient) and that existing between workpiece and the friction clamp means 61 (large coefficient). Thus, the workpieces slide readily over the surface 12 but they are not permitted to slip with respect to the friction clamp means 61.

It is an advantage of this system that each transfer arm 16 and 18 may carry a relatively large number of the friction clamp mechanisms 50, but for handling any particular shape and size of workpiece only a few of them may be used, the others remaining in their upper inactive positions. This provides a great flexibility in application, if desired, so that the system can be set up for handling any one of a wide variety of shapes and sizes of workpieces. It will be appreciated that this can be accomplished conveniently by providing individual shutoff valves in the air lines to the various clamp feet mechanisms 30. Those which are to be inactive during a particular production run are raised and their air lines are then shut off.

As described above, the friction clamp means 61 of the first transfer arm 16 have been firmly engaged down upon the workpiece W-1 at the receiving area 20 while the friction means 61 of the second arm 18 have similarly been clamped upon registered workpiece W-2 at the registration area 22. This operation of the friction clamping means is produced by a control switch 64 (FIG. 2) which senses the transfer arm bracket 28 at the input end of its stroke and the switch 64 is closed so as to energize a solenoid valve 65 (FIG. 12) which then opens to feed air to operate the cylinders 53 of respective clamp mechanisms 50.

It is to be noted that the friction clamp means 61 engage each workpiece near its leading edge with respect to the proposed direction of transfer. This prevents aerodynamic lifting of the leading edge and so prevents this edge from being flipped up and back by action of the air. When transferring a workpiece which includes a piece of fabric on top of another, then at least one of the friction clamp means 61 is arranged to come down onto the upper piece to hold it in place, i.e. to prevent aerodynamic lift during transfer.

Soon after the clamp feet of both transfer arms 16 and 18 have firmly engaged the workpieces W-1 and W-2 at the respective areas 20 and 22, the chain pin 44 passes in a curve around the sprocket 39 so as to produce a smooth forward acceleration of both transfer arms. This forward motion of the transfer arms continues and moves the workpieces W-1 and W-2 forward. They slide upon the smooth surface 12 while being held in nonslip relationship by the firm frictional engagement of the multiple clamp feet 61. At the forward end of their strokes the arm 18 is positioned directly over the combining area 24 while the arm 16 is positioned directly over the registration area 22. The arms dwell in these positions, and a control switch 66 is closed so as to energize another solenoid valve 67 (FIG. 12) which supplies air to the double-acting cylinders 53 so as to retract the clamp feet 61 up off from the workpieces W-1 and W-2.

Shortly after the clamp feet have been raised away from the workpieces, the chain 38 returns the arms 16 and 18 to their midstroke positions as shown in FIGS. 1 and 2, which is the end-of-cycle or rest position. When the transfer arms have reached this rest position, an end-of-cycle sensing switch 68 is closed by a cam member 69 on the arm bracket 28. This switch 68 causes the opening of a clutch in the chain drive mechanism 35 and actuates an electromagnetic brake, and switch 68 also initiates operation of the registration process. There is sufficient coasting movement of the transfer arms that the cam 69 just passes by the switch 68 and allows it to reopen before the arms come to rest. When the transfer arms have reached their rest position, a cam 71 holds closed a switch 72. This switch 72 causes a registration frame 80 (FIGS. 1, 2 and 4) to be lowered.

Figure 12:
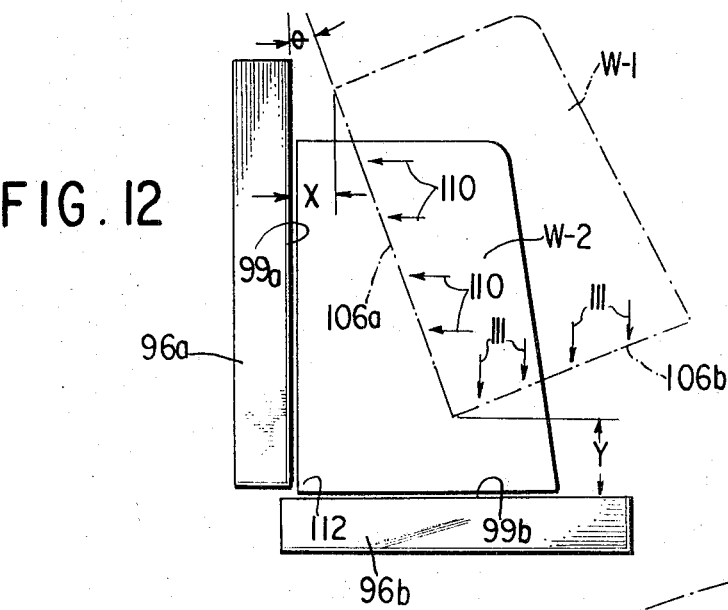
FIGS. 12–14 illustrate the registering of fabric workpieces of various configurations.

As shown in FIG. 12, the brief closure of the end-of-transfer-cycle switch 68, energizes a relay coil B and also energizes a time-delay relay coil TDA. The purpose of the time delay is to provide a brief time interval after the transfer arms 16 and 18 have reached their rest positions during which the closure of the switch 72 can produce lowering of the registration frame 80, as will be explained in detail later on in connection with FIG. 12.

The raising and lowering of the registration frame 80 is produced by suitable lift means 81, for example, an arm 82 (FIG. 2) which is pivoted at 83 to an overhead frame 84 secured to the main support frame 85 for the table 14. An elevator rod 86 is moved by an air cylinder 87 and this rod engages a pivot 88 which is secured to the arm 82. The outer end of the arm is connected by a pin 89 to an inner slidable lift column 90. Surrounding this column 90 is a concentric column 91 which slides within a sleeve 92 attached to the frame 84.

As shown in FIG. 4, the outer slide column 91 is attached at its lower end to registration stop means 92 including a horizontal platform 93 having several depending support legs 94 carrying one or more stop templates 96. These support posts 94 are adjustable in length by means of screws 97 and lock nuts 98, and they serve to position the stop templates 96 down flat upon the surface 12 when the registration frame 80 is lowered. The inner edge of the template or templates 96 are contoured as desired to provide stop surfaces 99 for providing precisely positioned surfaces against which to register one or more edges of a workpiece as will be explained. An antibuckling cover plate 100 overlies the stop surfaces 99 and projects inwardly toward the center region of the registration frame 80. This plate 100 prevents the fabric workpiece from buckling up after its edge has been impelled against the stop surface 99.

When the template means 96 comes down against the table surface 12, the stop means 92 is brought to rest, but the inner column 90 continues down further so that beater apparatus, generally indicated at 101, is brought down into operative position. This beater apparatus 101 is intended to apply brief gentle impulses to the workpiece for registering it and includes a plurality of rotating beaters 102 which come down into contact with the workpiece in the area 22 on the table surface 12. These beaters were previously set in rotation, and they include a plurality of resilient and laterally deflectable beating fingers 103. The antibuckling plate 100 has clearance slots 104 formed therein in alinement with the whirling beater fingers and through which these beating fingers pass into contact with the upper surface of the workpiece.

Figures 8, 9:
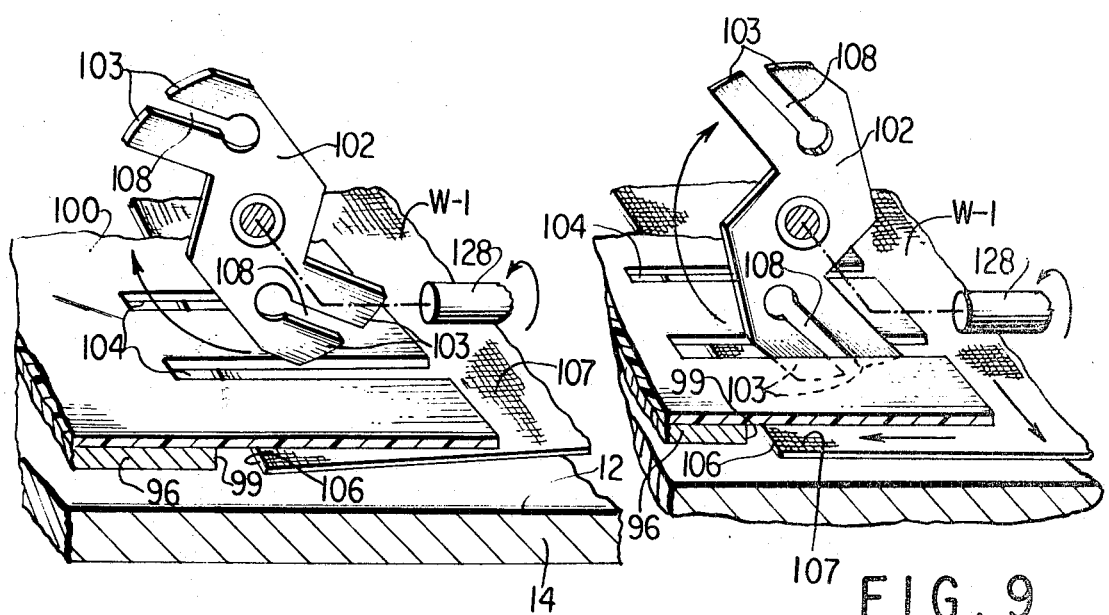
FIGS. 8 and 9 show successive operating steps of the registration.

As shown in FIGS. 8 and 9, these beating fingers apply brief force impulses to the workpiece thereunder for sliding the workpiece intermittently toward the stop surfaces 99 until its edge 106 comes into contact with this stop surface. These impelling force impulses are applied to the margin region 107 of the workpiece near its edge 106, so that the main body of the workpiece is under traction as its margin region is being impelled toward the stop surfaces 99.

In order to provide registration of the workpiece so that its position and orientation are accurately known, i.e. so that its location on the surface 12 with respect to coordinates (X, Y) and its angular position ($\theta$) are accurately known, two reference elements are employed which are effectively set at an angle one to the other, as shown in FIGS. 6 and 7. These two reference elements are the stop surfaces 99a and 99b. Also, a plurality of sets of beaters 105-1, 105-2, 105-3, and 105-4 are employed with their axes of rotation at an angle, which is here shown as being the same angle as between the reference elements, namely, a right angle. The number of sets of beaters 105 and their arrangement may be varied with the size and weight of the workpiece which is intended to be registered. The various beating rotors 102a and 102b impell the workpiece toward corresponding stop surfaces 99a and 99b each of which is contoured to mate with the corresponding contours of the edges of the workpiece. The respective fingers 103 of the sets of beaters 102a and 102b operate out of phase as indicated in FIG. 7, which is 90° out of phase in this embodiment. Thus, an impulse 110 is exerted on margin 107a for urging the edge 106a toward the stop 99a. The next subsequent impulse 111 is applied to margin 107b for moving the edge 106b toward the stop 99b. Then the succeeding impulse is applied again to the margin 107a, and so forth. The result is that brief force impulses 110 and 111 are applied alternatively to the two angularly positioned margins 107a and 107b for providing a "cornering" action. That is, the net result of the alternately acting impulses 110 and 111, which are at an angular relationship, is to drive the corner or vertex 112 of the fabric into the corresponding corner or vertex space 114 defined by the angularly positioned stop surfaces 99a and 99b. Thus, an X, Y and θ registration are all produced.

The impulses 110 and 111 are directed toward the adjacent stop surfaces 99a and 99b and their alternate occurrence moves the fabric workpieces by small, rapidly occurring, sliding movements toward these respective surfaces 99a and 99b so that its edges 106a and 106b are moved flush against the corresponding stop surfaces 99a and 99b.

The contour of these stop surfaces 99a and 99b matches the contour of the edges 106a and 106b of the workpiece to be registered. Consequently, when the respective edges are flush against the respective stop surfaces, a precise registration has been produced.

The beater rotors 102 are formed of a stiff resilient and durable material which will not mar or scuff the fabric. For example, the rotors as shown are cut of a sheet of stiff flexible polyurethane which is one-eighth of an inch thick. The individual fingers 103 are inclined backwardly to the direction of rotation, and in this example the fingers in each beater rotor are in pairs diametrically opposed with slots 108 therebetween. Each pair of fingers 103 come into contact with the fabric so closely together in time that they together may be considered to exert one impulse. Thus each rotor 102 effectively produces two impulses per revolution.

The exact shape or number of fingers 103 in each rotating beater is not critical. In fact any one, two, or three fingers may be cut off from any rotor 102 and the registration process is still successfully performed. The advantage of having more than one finger on each beater is that the impulses occur more frequently so that the registration is produced more rapidly, but the speed of registration is not always linear with respect to the rate of pulsing.

We have found that the characteristics of various types of fabric and different sizes and weights of workpieces are so different that the user of this method and apparatus should try several different rotor speeds and then use that which produces registration most quickly. This differs with the actual stiffness, thickness and number of layers of fabric in each workpiece as can readily be determined by following our teaching herein and trying different speeds such as 600 r.p.m., 500 r.p.m., 400 r.p.m., 300 r.p.m., 200 r.p.m. and 150 r.p.m., when using beaters having the actual size and characteristics as described and shown in FIGS. 8 and 9, namely 2⅛ inches in diameter.

Figure 13:
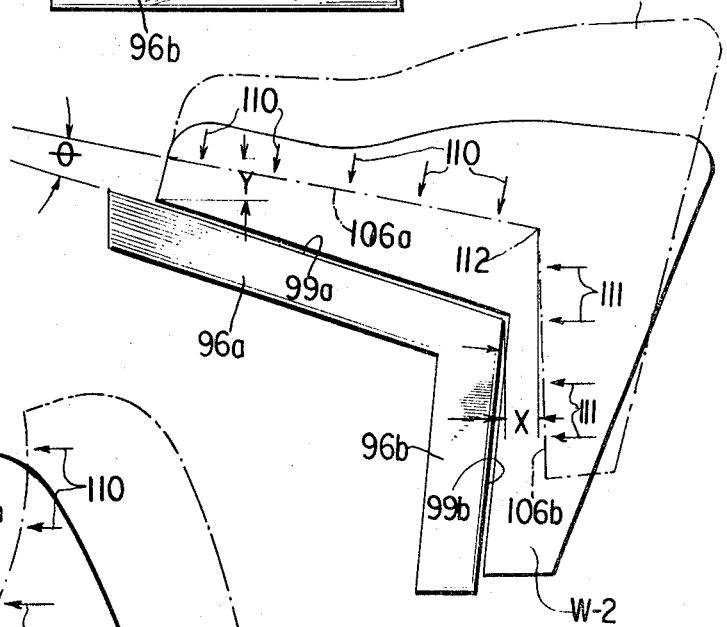
Figure 14:
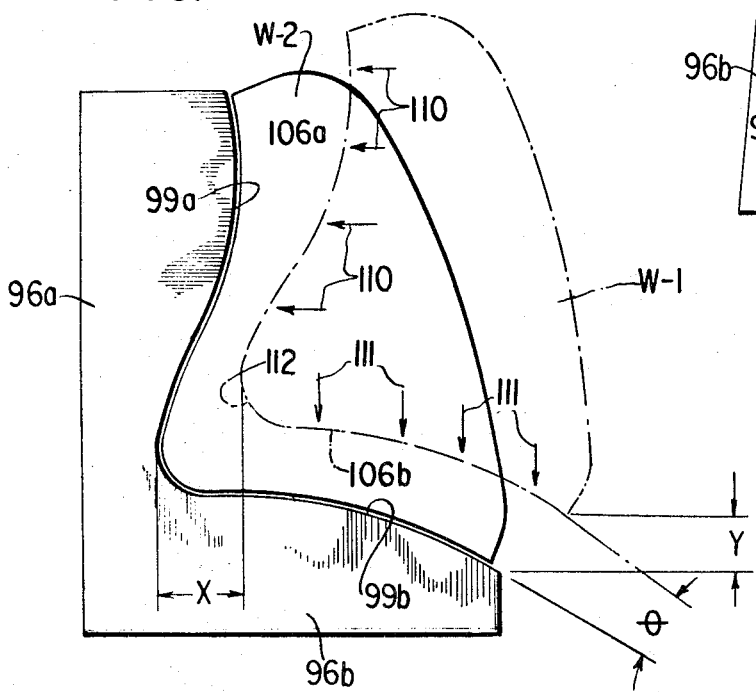

It is important to note that by alternately occurring impulses 110 and 111 toward the stop surfaces 99a and 99b a rotational mode of orientation (θ) is provided as well as linear movement (X and Y). FIGS. 12, 13 and 14 are illustrations in which various shapes of workpieces W-1 in their initial locations (shown dotted) are askew as well as being out of position. In being impelled into the registered position as shown at W-2, each workpiece becomes turned by an angle (θ) as well as being moved by distances (X) and (Y). When in the registered position, the edges 106a and 106b mate with the corresponding stop surface 99a and 99b.

FIGS. 12, 13, and 14 also show that as used herein the expression "two angularly positioned edges" is intended to include two edges having an acute, right, obtuse or reentrant angle therebetween. Also, the term "edges" includes straight, curved, or irregularly shaped edges. There may be a well-defined corner 112 between these two edges as shown in FIGS. 12 and 13 or the corner may be so very rounded as to be only a gentle change in direction.

The antibuckling plate 100 is spaced above the surface 12 only slightly more than the thickness of the workpiece being registered, as is shown in FIG. 4. To damp out the movement of the workpiece, a plurality of small depending hair springs 116 may be used, extending down below the lower surface of the plate 100 with their ends canted toward the respective stop surfaces 99. These springs 116 are helpful in some, but not most cases to produce a more precise registration between the edges of the workpiece and the stop surfaces. The ends of these springs engage the upper surface of the fabric and damp out movement of the workpiece to prevent the edges of the workpiece from vibrating away from the respective stops after it has become registered against them.

As shown in FIGS. 4 and 6, the various sets of beaters 105 are rotated by a small electric motor 119 mounted on a registration head chassis 120 which is secured to the inner column 90. This motor 119 drives a small-link lightweight sprocket chain 121 turning a shaft 122 and also drives a sprocket chain 123 which turns a shaft 124. The reason for using positive drive means, for example such as these chains and sprockets is to assure that the out-of-phase time relationship exists between the respective beater sets 105-1 and 105-2 which are on one axis and the other beater sets 105-3 and 105-4 which are on another axis perpendicular thereto. In this example these respective beater sets are operating 90° out-of-phase. The shaft 122 drives the beater set 105-4 by means of mitre gears 126 and drives the beater set 105-3 at the same speed in the same direction by mitre gears 127.

Each set 105 of beaters can be removed and replaced quickly and conveniently as shown in FIG. 5. The various rotors 102 are secured in spaced relationship to a common shaft 128 having a tongue 129 at one end and a projecting lug 130 at the other. The tongue is received in a slotted socket in a drive shaft 131 held by bearing means 132, while the lug 130 is inserted into a hole in a self-alining bearing 133. A compression spring 134 surrounds the shaft 128 near the lug and serves to hold the tongue 129 in its socket. To remove a set 105 for replacement, the spring 134 is compressed by sliding the lug 130 farther into its bearing so that the tongue 129 can be disengaged and removed from its socket, then the lug 130 is removed from the bearing 133.

All of the bearings 132 and 133 for the respective beater sets and for the shafts 131, 122 and associated bevel gears are mounted upon the registration head chassis 120 which is secured to the lower end of the slidable inner column 90. Thus, as described above, they are lowered farther to bring the beaters into engagement with the workpiece to be registered after the stops 96 have all been placed at their proper locations.

After an appropriate length of time has passed to allow the registration operation to be performed, the lift means 81 (FIGS. 1 and 2) gently raises the registration head chassis 120, while the stops 96 remain at their locations on the table surface 12. The resulting gentle upward movement of the rotating beaters 102 progressively reduces the magnitude of the beating impulses 110 and 111 which are being applied to the workpiece until these impulses have been diminished to zero as the fingers 103 are lifted clear away from contact with the fabric. This progressive diminution of the beating impulses assures that the precise edge registration is maintained and also assures that the registration of the corner (vertex) 112 is maintained.

The inner column 90 continues its upward travel until a resilient bumper 140 (FIG. 4) supported on a collar 142 on the column 90 comes up against the platform 93 and this bumper then raises the whole stop apparatus 92. Accordingly, beater apparatus 101 and stop apparatus 92 are now raised together to their inactive upper position. In summary, it is noted that the stops 96 are positioned before the beaters are brought fully into their operative positions, and the stops remain positioned until after the beating impulses have discontinued. This prevents the workpiece from being impelled beneath any stop before the stop is ready and prevents the workpiece from being dislodged from its registered position while the beating impulses are tapering down to zero.

As a result of the registration operation this newly registered workpiece W-2 is now in exactly the same position as was the previously registered workpiece W-2 and so it is now in readiness for the next transfer operation. After the registration frame 80, including the stop apparatus 92 and the beater apparatus 101, has reached its upper inactive position, and after a combining operation has occurred, as will be described, then the transfer arms 16 and 18 are moved toward the left to engage the new workpiece W-1 at the receiving area 20 and also to transfer this registered piece W-2 over to the combining location 24, as previously described.

It is to be noted that FIG. 1 shows a second registration frame 80A which is spaced a small distance away from the frame 80 and is generally in lateral alinement with the frame 80. This frame 80A is used in conjunction with the frame 80 when longer workpieces such as trouser leg panels are being handled. When smaller workpieces are being handled, the frame 80A is allowed to remain in its upper or rest position. It has suitable lift means, as will be understood. The registration frame 80A is identical with the frame 80 except that it only includes beaters turning about one axis and stop means associated therewith. That is, the registration unit 80A is not required to produce corner registration, because one corner or vertex of the long workpiece is being registered by the companion unit 80. Accordingly, this frame 80A registers an edge portion 106c of the workpiece remote from the corner 112 and adjacent edge portions 106 and 106a.

In summary, when two angularly positioned edges are registered, then the position of a workpiece of known configuration is fully and accurately known, this precise registration having been produced entirely automatically.

In the foregoing process in order to produce registration against stop surfaces 99a and 99b which are at an angle one to the other, two sets of beaters 102a and 102b are used revolving about axes which are at an angle one to the other generally corresponding with the angle of these stop surfaces. This provides a "cornering action" as described above in detail.

There is an alternate process which may occasionally be utilized for producing a "cornering" action when handling small workpieces. In this alternate process only one set 105 of beaters 102 is utilized rotating about an axis which is generally perpendicular to the bisector of the vertex angle 114 between the two stop surfaces 99a and 99b. In other words the beating rotors 102 are revolving in planes parallel to this bisector so that the beating impulses are applied to the workpiece in a direction parallel to the bisector and directed into the corner or vertex 114 between the stop surfaces. The resultant beating impulses urge the fabric corner 112 into the stop corner 114. Any requisite lateral movement of the workpiece with respect to the plane of revolution of the beating fingers is accommodated by the lateral compliance of the individual fingers 103 which enables them to deflect laterally during a beating stroke. Thus the workpiece becomes precisely registered into the corner 114.

FIG. 10 shows a plan view of a portion of an automatic production line in which a plurality of previously registered workpieces W-2 and W-4 are combined. As explained previously, the workpiece W-1 on the table 14 is transferred in the direction of the arrows from the receiving area, generally outlined at 20, over to the registration area 22 at which it is brought into registration. This registered workpiece is indicated by the reference number W-2; and it is transferred over to the area 24 while its registered relationship is retained.

Similarly, an unregistered workpiece W-3 is received on a table 14A in the receiving area 20A. The worktable 14A has its long axis converging toward the combining area 24 on the table 14. This unregistered workpiece W-3 is transferred by a similar operation over to a registration area 22A in which it is registered, as indicated at W-4. The registered relationship of the workpiece W-4 is preserved while it is transferred over to an area 24A which is conveniently near the area 24.

It will be understood that the transfer and registration on the companion table 14A proceeds at the same pace in synchronism with these steps on the table 14. Thus, when the registered workpiece W-2 arrives at the combining area 24, the workpiece W-4 arrives at the adjacent area 24A. This workpiece 24A is then lifted up automatically by a suction head 149 (FIG. 11) and placed down upon the registered relationship. As shown in FIG. 11, the suction head 149 is mounted on a vertical plunger mechanism 150 which is similar to the operating mechanisms 50 for the friction feet 61. The plunger mechanism 150 is carried by a horizontal traveller 151 moved by a piston rod 152 and a cylinder 153. The suction head 149 has a screen extending horizontally across its lower surface and the suction holds the workpiece W-4 up against this screen. Thus, this head 149 lifts the workpiece W-4 over so as to deposit it as indicated by the dotted lines W-4' on the workpiece W-2.

After these two workpieces have been accurately combined, as described, then they are automatically transferred over onto a companion table 154 which comprises the fastening station. In this fastening station the workpiece W-4 for example a hip pocket patch, is fastened to the workpiece W-2, for example a trouser leg panel. This fastening station may utilize any suitable fastening means. For example the two workpieces may be sewn together by a sewing machine or may be suitably fused together. This fastening station may advantageously utilize automatic stitching equipment.

In FIGS. 15—17 are illustrated a further embodiment of method and apparatus for combining a plurality of workpieces in known relationship. This apparatus shown in FIGS. 15—17 is a modification of the apparatus shown in FIGS. 10 and 11. As explained previously, the workpiece W-2 on the table 14 has been registered and is in its registered relationship in the area 24. Also, the workpiece W-4 is in a registered relationship in the area 24A on movable platform means 160 which normally is positioned to form an end portion of the table 14A. Only the adjacent parts of the tables 14 and 14A are shown, and the long axis of the table 14A extends toward the combining area 24 of the table 14, similar to the arrangement in FIG. 10.

As previously described in connection with FIGS. 10 and 11, the transfer and registration of the workpiece W-4 has occurred in step with the workpiece W-2 so that the workpiece W-4 is now ready to be combined with the workpiece W-2 This combining process is carried out by utilizing the differential in the friction between the workpiece W-4 and its supporting surface 160 and the friction between the workpiece and friction clamp means 164, as will be explained.

The end platform 160 of the table 14A is movable and has a smooth surface of low coefficient of friction, for example of polished metal, slippery plastic, and the like. This movable platform means 160 is normally contiguous with the surface of the table 14A and is slightly lower than the surface of the table 14A so that the workpiece W-4 can be transferred from the area 22A over to the area 24A without becoming snagged on the joint 162.

After the workpiece W-4 has been transferred onto the movable platform means 160, friction clamp means 164 are actuated for firmly holding the workpiece W-4 in its desired position. The friction clamp means 164 are similar to the clamp mechanisms 50 (FIGS. 1, 2 and 3) and include a friction clamp foot member 161 which is similar to the friction clamp foot 61 (FIG. 3), except that the friction clamp 161 is sufficiently large to cover the entire workpiece W-4. This friction clamp 161 has a lower surface with a high coefficient of friction, for example, as provided by a sponge rubber pad 63. This friction clamp 161 can be raised and lowered by a vertical plunger mechanism 150 carried by a horizontal traveller carriage 151 moved by a piston rod 152 and a cylinder 153, all similar to those corresponding elements shown in FIG. 11.

In order to synchronize the horizontal movement of the friction clamp 161 with the movement of the platform 160, there is a locking pin 168 carried by the carriage 151 which is inserted into a hole 170 in the platform 160. This locking pin 168 is operated by a double-acting cylinder 172 which is mounted on the traveller carriage 151.

While the workpiece W-4 is being clamped in place on the movable platform 160, a double-acting cylinder 174 is actuated for moving the platform 160 over to its alternative position (as shown in FIG. 16) where it is located directly over the workpiece W-2. This cylinder 174 is located beneath the table 14A and has a piston rod 176 connected to a pair of slide rods 178 which are supported by sleeve bearings 180. These slide rods 178 are extended out as shown in FIG. 16 by movement of the piston rod 176. The friction clamp foot 161 moves in synchronism with the platform 160 so that this clamp 161 remains firmly pressing down against the workpiece W-4. Now that the workpiece W-4 is located directly over the desired position on the workpiece W-4, the locking pin 168 is retracted from the hole 17.

For combining the workpiece W-4 with W-2, the platform 160 is suddenly retracted as shown in FIG. 17. The differential in friction permits the platform 160 to slide out from beneath the workpiece W-4 while W-4 remains frictionally held by the clamp 161. This friction clamp foot 161 is held stationary by the cylinder 153 as the platform 160 is abruptly withdrawn.

As soon as the platform 160 has been withdrawn completely from beneath the workpiece W-4, the downward pressure of the friction clamp 161 pushes this workpiece W-4 vertically down onto the desired location on the workpiece W-2. The clamp foot 161 is elevated by the mechanism 150, leaving the two workpieces combined in the desired accurate relationship for further operations to be performed on them, for example such as fastening them together by stitching, fusing, cementing and the like.

As shown in FIG. 17, the platform 160 has now been completely retracted into its initial position where it forms an extension of the table 14A. Also, now that the clamp 161 has been elevated, the traveller carriage 151 is ready to be moved over above the next workpiece W-4 as initially shown in FIG. 15 to begin the next combining sequence of steps.

Figure 18:
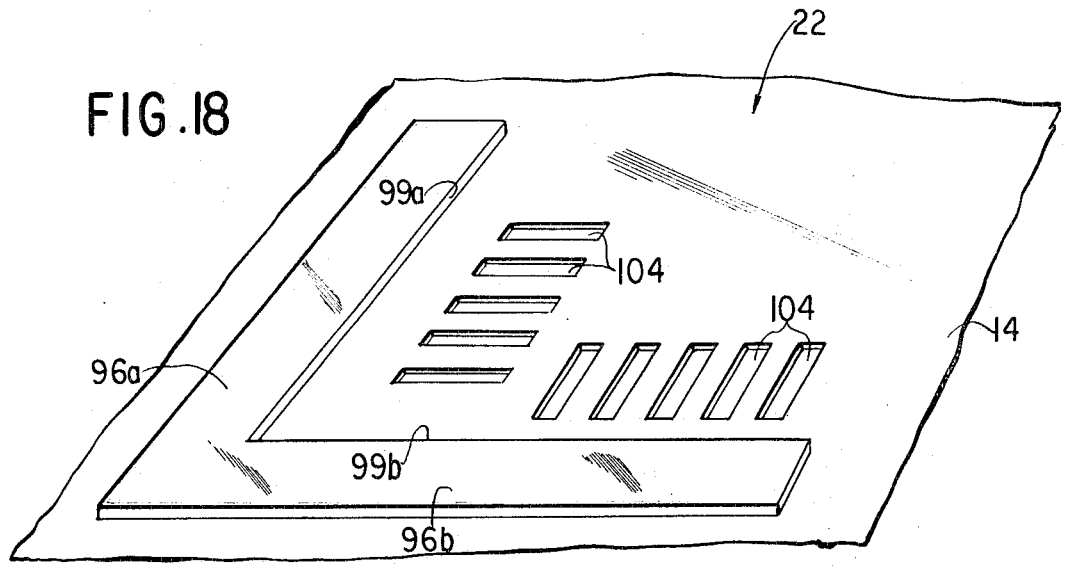
FIGs. 18 and 19 show modified registration apparatus.
Figure 19:
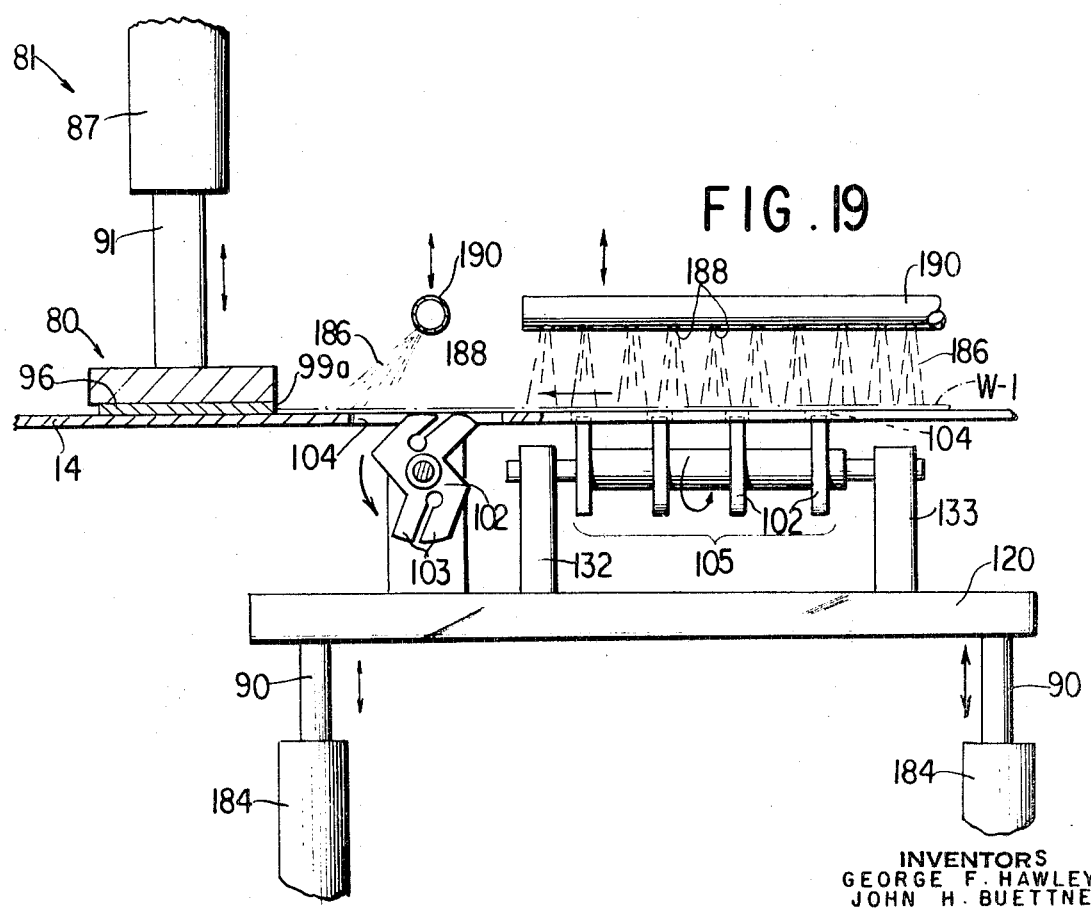

FIGS. 18 and 19 illustrate a modified registration apparatus for performing a registration process similar to that illustrated in FIGS. 4—9 and 12—14. In the registration area 22 of the table 14, there are a plurality of elongated clearance apertures 104 each of which is alined with a beating rotor 102 positioned beneath the table 14.

After the unregistered workpiece has been transferred into the registration area 22, stop template means 96 have been lowered into place on the table 14, then a plurality of beating rotors 102 are raised as shown in FIG. 19 so that they now protrude through the slots 104 to engage the lower surface of the workpiece W-1 or W-3 to be registered. The bearing supports 132 and 133 for the sets 105 of beaters 102 are mounted on movable chassis means 120 connected to rods 90 operated by cylinder means 184 for raising and lowering the beaters.

While the workpiece is being registered against the stop surfaces 99a and 99b by the impulses from the beaters, an antibuckling pressure is applied by means of air jets 186 issuing from orifices 188 in compressed air manifold means 190. These jets 186 are directed downwardly and outwardly at an angle toward the respective stop surfaces 99a and 99b and these jets impinge on the margins of the workpiece to aid in impelling the workpiece toward these stop surfaces. The downward force of these jets on the workpiece increases the frictional engagement between the impelling fingers 103 and the lower surface of the workpiece W-1 as it is being registered.

After the registration has been completed, the chassis means 120 is lowered to remove the beaters 102. To provide clearance for movement of the transfer arms 16 and 18 (FIGS. 1, 2 and 3) the registration frame 80 is raised up away from the table 14. For additional clearance, the manifold means 190 may also be raised by the lift means 81 as indicated by the arrows, the compressed air being supplied through a flexible hose to permit the movement. After the registration has been completed, the jets 186 are normally shut off by operating a solenoid valve in the air supply line, before the stop means 96 are raised. The purpose of shutting off these jets is to prevent dislodging the workpiece from its registered position. In applications for automatically handling relatively stiff, heavy fabric, then the jets 186 may continuously issue from the orifices 188.

Figure 20:
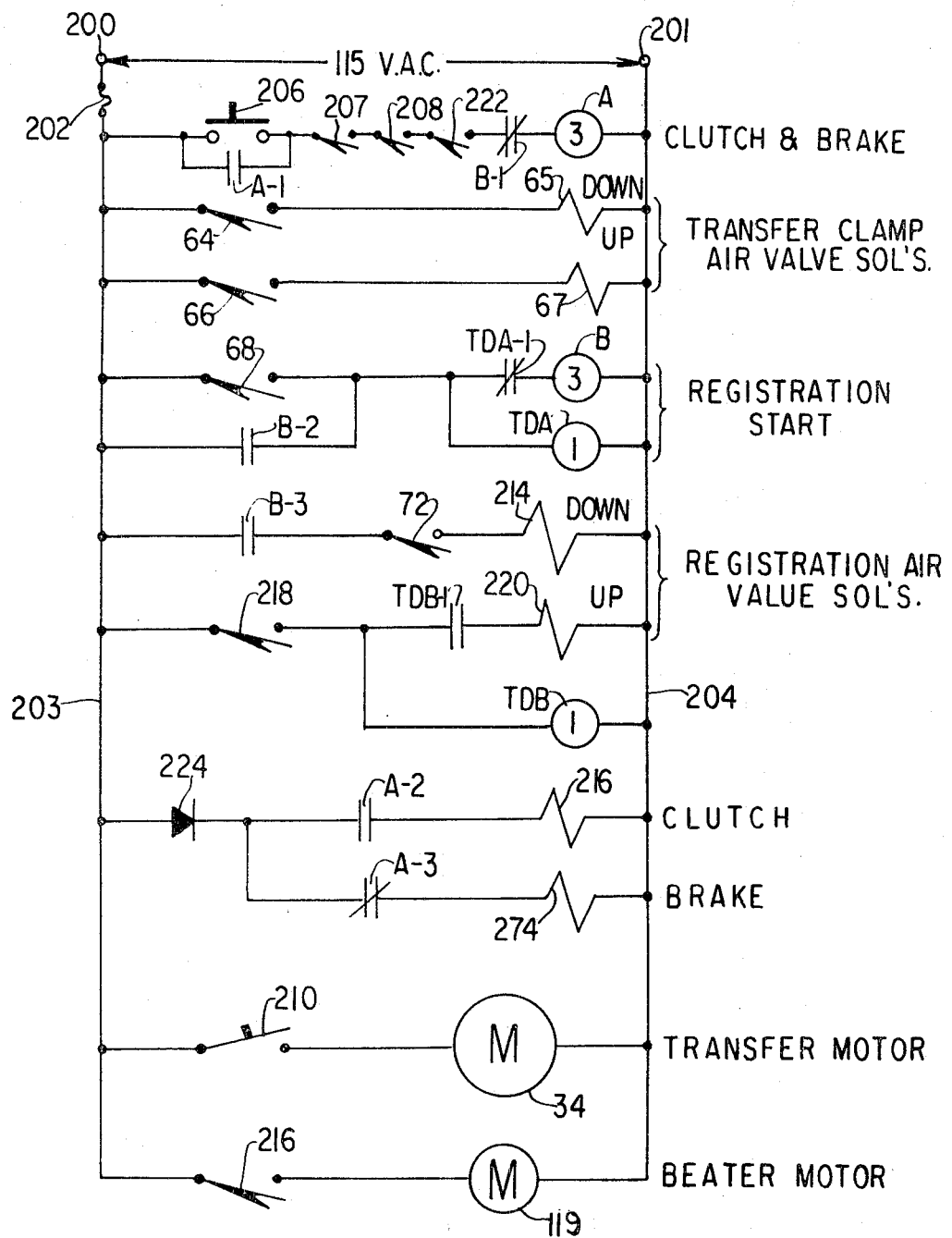
FIG. 20 is a schematic electrical diagram of an electrical control system.

In FIG. 20 is shown a schematic circuit diagram of the electrical control system as included in the illustrative apparatus being described. It will be understood by those skilled in the art that various control arrangements can be utilized to produce the desired sequence of steps as disclosed herein. In this circuit diagram the respective mechanically activated control switches such as 64, 66, 68, etc., sometimes called "limit" switches, are schematically represented by contact arms having an associated level symbol representative of an actuator for sensing the fact that a particular mechanical component has reached the desired limit or position of its travel.

This control system includes certain relays for producing various interrelated actions and sequential operations as explained below. Each of these relays includes a magnet winding and one or more pairs of switch contacts which are opened or closed when the relay winding is energized. The magnet winding of each relay is indicated by a circle, for example, such as the winding A of the clutch and brake relay. The number "3" which appears within the circle A shows the number of pairs of switch contacts that are operated upon energization of the relay winding A, and so forth.

A normally open pair of contacts, that is, a pair of contacts which remain open when the winding is not energized, are shown by two parallel vertical lines. A normally closed pair of relay contacts are indicated by a diagonal line which crosses the parallel vertical lines.

Also shown are two time-delay relays TDA and TDB for providing an appropriate time-delay so as to assure that a certain operation or sequence has occurred completely before the next step in the process.

The power means for producing movement of certain mechanical parts of the apparatus include fluid-operated cylinders, shown as air cylinders. The air flow to respective ones of these cylinders is controlled by one or more solenoid air valves, and the solenoid windings of these air valves are shown in FIG. 20.

The electrical power is supplied from a conventional alternating current source such as connections 200 and 201 for supplying a.c. of 60 cycles at 115 volts. A fuse 202 is included adjacent to the terminal of the "hot" supply line 203, while the other line 204 is at ground potential.

In operation a pushbutton switch 206 is closed to start a transfer cycle. A pair of switches 207 and 208 are closed when the registration frames 80 and 80A (FIGS. 1, 2, 4, 19) are fully raised. Therefore, these switches 207 and 208 act as a safety interlock for preventing motion of the transfer arms 16 and 18 to avoid possible collision with the registration frames 80 or 80A if the frame is not up.

The relay winding A is included in the clutch and brake relay, and when winding A is energized, it serves to release a brake and engage a clutch. It is assumed that the operator has closed a manual switch 210 so that the transfer motor 34 is running.

The relay winding A holds itself energized through its self-holding contacts A-1 which have now become closed. The opening of relay contacts A-3 serves to deenergize a magnet winding 214 of the brake, while the closure of contacts A-2 energizes the magnet winding 216 of the clutch, causing the transfer arms 16 and 18 to be moved by the motor 34 as described.

When the transfer arms have moved backward to the limit of their travel, the switch 64 is closed as described above in connection with FIGS. 1 and 2, and this energizes the solenoid valve winding 65 so as to actuate the friction clamp feet mechanisms 50 to their down positions. After the transfer arms 16 and 18 have moved forward to their release position, the limit switch 66 is closed for energizing the solenoid valve winding 67 to raise the friction clamp feet 61. Then the transfer arms return toward their rest positions.

Just before the rest position is reached the switch 68 is momentarily pushed closed. This momentary closure starts a sequence of events resulting in the stopping of the transfer arms and the commencement of registration. The switch 68 energizes relay coil B and time delay relay coil TDA. The contacts B-1 are opened, which deenergizes the clutch and brake relay coil A so that the clutch is disengaged and the brake is applied.

The contacts B-2 serve to hold the relay coil B energized until the delay period of the relay TDA has passed. This occurs a short period of time after the transfer arms 16 and 18 have reached their rest positions. Also, because the switch 72 is held closed when the transfer arms are in their rest position, the contacts B-3 serve to energize a solenoid valve winding 214 for supplying air to the cylinder 87 (FIG. 2) to lower the registration frame 80, and also 80A, is desired. The switch 72 serves as a safety interlock, preventing the registration frames from being lowered unless the transfer arms are in their rest positions, where they are out of the paths of the registration frames.

The purpose of the time delay TDA is to deenergize the relay B after the registration frame or frames have started moving down. As soon as the relay is deenergized, the contacts B-1 reclose, but the relay winding A cannot become energized because the interlock switches 207 and 208 have become opened upon the lowering of the registration frames 80 and 80A. When the registration frame starts down, a control switch 216 becomes closed for energizing the beater rotor driving motor 119. If desired, the beater motor remains continuously energized.

As soon as the registration frame has touched the table surface 12, a control switch 218 is pushed closed. Thus, a time delay relay coil TDB is energized. The delay period of this relay TDB is sufficient to permit the registration process to be carried out. At the end of the delay period, the contacts TDB-1 are closed, which energizes a solenoid valve winding 220 for operating the cylinder 87 to raise the registration frames. Thus, the registration frames return to their up positions, which closes the switches 207 and 208 to recommence the transfer operation.

In order to assure that the combining operation has been completed before the transfer occurs, a control switch 222 is in series with the clutch and brake relay. This switch 222 is closed when the combining head 149 is out of the way in an intermediate rest position. A rectifier 224 is included so that the magnet windings 214 and 216 are energized by unidirectional current.

As used herein the term "corner" is intended to include any abrupt change in direction of the edge of a fabric workpiece, and consequently "corner" as used herein includes any apex, vertex and the like, regardless of whether the change in direction at the corner is a right angle, acute angle, or obtuse angle, for example see FIGS. 12, 13, and 14. It will also be understood that the term "corner" includes reentrant corners, that is corners wherein the change in direction is greater than 180° from one edge to the other edge as measured in an arc lying in the plane of the workpiece, for example, as shown in FIG. 13.

From the foregoing it will be understood that the methods and apparatus of the present invention as described above are well suited to provide the advantages set forth. It will be appreciated from the foregoing that many possible embodiments can be made of the various features of the transfer and registration methods and apparatus as described, and that all matter hereinbefore set forth or shown in the accompanying drawings is to be interpreted as illustrative and not in a limiting sense, and that, in certain instances, some of the features of the invention can be used without a corresponding use of other features, all without departing from the scope of the invention as defined in the following claims.

We claim:

1. Apparatus for transferring and registering fabric workpieces automatically comprising means defining a registration region for the fabric workpieces, first transfer means engageable with the fabric workpieces and movable with the workpieces for transferring them one at a time to said registration region, registration stop means at said registration region, means applying force impulses to the workpiece in said registration region for moving an edge of the workpiece against said stop means to register the fabric workpiece, and second transfer means engageable with the workpiece and movable with the registered workpiece for transferring the workpiece away from said registration region while maintaining its registered relationship.

2. A method of registering a limp fabric workpiece to bring an edge of said workpiece into an accurately known location comprising the steps of providing a stop defining said known location, providing a supporting surface upon which the workpiece is slidable, providing a second surface spaced slightly above said supporting surface and parallel therewith by a spacing slightly more than the thickness of said limp fabric workpiece, and applying brief force impulses urging the workpiece edge first toward said stop surface, whereby the edge of said limp fabric workpiece is accurately registered against said stop without buckling the workpiece.

3. A method of registering a corner of a fabric workpiece to bring the corner and first and second adjacent edges into an accurately known location and orientation comprising the steps of providing first and second stop surfaces having contours matching said adjacent edges, respectively, providing a low-friction work supporting surface extending toward said stop surfaces, moving the workpiece into an initial general location on said supporting surface with said first and second edges positioned generally in the same orientation as said first and second stop surfaces and spaced from said first and second stop surfaces, respectively, flowing air toward said workpiece and applying a first plurality of force impulses to the bottom of said workpiece directed generally toward said first stop surface impelling said workpiece to move said first edge toward said first stop surface, applying a second plurality of force impulses to the bottom of said workpiece directed generally toward said second stop surface impelling said workpiece to move said second edge toward said second stop surface, force impulses of said first plurality alternating in occurrence with force impulses of said second plurality to move said first and second edges against said respective matching stop surfaces, thereby accurately locating and orienting the fabric workpiece.

4. The process of registering a limp fabric workpiece to bring it into known location and known orientation by registering the corner and two edges of the workpiece which are adjacent to said corner to bring said corner and said adjacent edges into an accurately known location comprising the steps of providing a pair of stop surfaces having contours matching said pair of adjacent edges, respectively, positioning the limp fabric workpiece with one of said edges facing generally toward one of said stop surfaces and with the other of said edges facing generally toward the other of said stop surfaces, applying brief force impulses to the two margins of the workpiece near to said respective edges and directed toward the respective stop surfaces, the brief force impulses which are applied to one of said margins alternating in occurrence with the brief force impulses which are applied to the other of said margins, engaging said registered workpiece with transfer means movable with the workpiece, and moving said transfer means together with the workpiece to a second position to deliver the registered workpiece to said second position while maintaining its registered relationship.

5. The process of registering a corner and two edges of a fabric workpiece which are adjacent to said corner to bring said corner and said adjacent edges into an accurately known position comprising the steps of providing a smooth supporting surface having a low coefficient of sliding friction with said workpiece, placing said workpiece upon said supporting surface, providing a pair of stop surfaces having contours matching the respective contours of said pair of adjacent edges, providing openings in said supporting surface, alternately applying brief force impulses through said openings to the underside of the two margins of the workpiece near to said respective edges and directed toward the respective stop surfaces for sliding said workpiece toward said respective stop surfaces until said edges have touched said respective stop surfaces.

6. The process of registering the edge of a fabric workpiece in an accurately known position comprising the steps of providing a smooth supporting surface having a low coefficient of sliding friction with said workpiece, placing said workpiece upon said supporting surface, providing a stop surface having a contour matching the contour of said edge, frictionally engaging the margin of the workpiece near to said edge at a plurality of points spaced along said margin for applying brief force impulses to said points of the margin, said force impulses being directed away from the main body of the workpiece toward said stop surface placing the main body of the workpiece under traction for sliding the workpiece over said supporting surface toward said stop surface until said edge has touched said stop surface along the length of said stop surface, and wherein said brief force impulses are applied to said margin on the top face of said workpiece, and providing a guide surface above said top surface and closely adjacent to said top surface, the spacing between said guide surface and said top surface being slightly greater than the thickness of the workpiece for preventing buckling of the margin of said workpiece when said edge abuts against said stop surface.

7. The process of registering the edge of a fabric workpiece in an accurately known position comprising the steps of providing a smooth supporting surface having a low coefficient of sliding friction with said workpiece, placing the workpiece upon said supporting surface, providing a stop surface having a contour matching the contour of said edge, frictionally engaging the margin on the bottom face of the workpiece near to said edge at a plurality of points spaced along said margin for applying brief force impulses to said points of the margin, said force impulses being directed toward said stop surface for sliding the workpiece over said supporting surface toward said stop surface, applying a downward force on the top face of the workpiece at the margin for holding the margin of said workpiece down to increase the frictional engagement of said force impulses, and discontinuing the application of said force impulses after said edge has touched said stop surface along the length of said stop surface.

8. The process of registering the edge of a fabric workpiece as claimed in claim 7 and wherein said force for holding the margin of the workpiece down is applied by an air flow down toward the top face of the margin near said edge.

9. Apparatus for registering a fabric workpiece comprising support table means for supporting the fabric workpiece, said table means having a stationary top surface with a small coefficient of sliding friction allowing the workpiece to be slid thereon, stop means for engaging an edge of the workpiece, first means for controlling the movement of the workpiece across said stationary top surface of said table means to position the workpiece offset from said stop means, impulse applying means for applying a plurality of brief force impulses to the workpiece directed toward said stop means for sliding the fabric workpiece along said stationary top surface until an edge engages against said stop means to register said edge against said stop surface, and second means movable with the workpiece controlling the movement of said workpiece across said stationary top surface of said table means to maintain registration of the workpiece while moving the workpiece away from said stop surface.

10. Apparatus for registering a fabric workpiece as claimed in claim 9 and wherein said impulse applying means is positioned beneath said table means, and said table means has openings therein through which said impulse applying means applies impulses to the workpiece for urging the workpiece toward said stop means by brief, gentle impulses.

11. Apparatus for registering a fabric workpiece comprising stop means for engaging an edge of the workpiece, a table having a work supporting surface upon which the workpiece is readily slidable, means above said work supporting surface for guiding the workpiece toward said stop means, said guiding means having a plurality of openings therein, and a plurality of impelling rotors engaging the upper surface of the fabric workpiece through said openings for urging an edge of the workpiece toward said stop means.

12. Apparatus for registering a fabric workpiece as claimed in claim 11 and wherein said guiding means is a top plate extending over the upper surface of the workpiece and said impelling rotors engage the upper surface of the workpiece through openings in said top plate.

13. Apparatus for registering a fabric workpiece so that its position and orientation are accurately known comprising a first and a second reference element effectively set at an angle one to the other, supporting means for supporting the fabric workpiece near said first and second reference elements, a first plurality of rotating beaters having a first plurality of resilient deflectable projecting elements intermittently engaging the workpiece for impelling it toward said first reference element, and a second plurality of rotating beaters having a second plurality of resilient deflectable projecting elements intermittently engaging the workpiece for impelling it toward said second reference element, said second plurality of projecting elements engaging said workpiece during time intervals when said first plurality of projecting elements are out of engagement with said workpiece, and vice versa.

14. Apparatus for registering a fabric workpiece as claimed in claim 13 and wherein said first and second plurality of beaters are rotating at the same speed and said first and second plurality of projecting elements are angularly displaced and operate out of phase with respect to each other.

15. Apparatus for registering and transferring a fabric workpiece comprising table means with a top surface having a low coefficient of sliding friction with the workpiece, movable transfer means having clamp means engageable with a fabric workpiece and holding the workpiece against slipping with respect to said clamp means, means for moving said clamp means into and out of engagement with the workpiece, drive means moving said transfer means for transferring the workpiece by sliding it over said top surface, reference means for engaging an edge of the workpiece, and a plurality of rotatable members having projecting resilient elements engageable with the workpiece for impelling it against said reference means.

16. Apparatus for registering and transferring a fabric workpiece as claimed in claim 15 and wherein said movable transfer means move back and forth in a direction parallel with said top surface, and including friction clamp means carried by said transfer means and operating means for moving said friction clamp means into and out of engagement with the workpiece.

17. Apparatus for registering and transferring a fabric workpiece as claimed in claim 16 and wherein said clamp means move in a direction perpendicularly to said top surface for frictionally engaging and disengaging the workpiece without dislodging it.

18. Apparatus for automatically transferring a plurality of fabric workpieces comprising table means having a top surface upon which the fabric workpieces can be slid, a plurality of movable transfer arms extending above said top surface, transfer drive means for moving said transfer arms back and forth in a direction parallel with said top surface, and a plurality of friction clamp elements carried by said transfer arms, and operating means for bringing said friction clamp elements into engagement with the fabric workpieces for sliding the workpieces over said top surface.

19. Apparatus for automatically transferring a plurality of fabric workpieces in succession from one to another of a succession of areas comprising table means having a top surface upon which the fabric workpieces can be slid, said top surface defining a plurality of spaced areas, a plurality of movable transfer arms extending above said top surface, said transfer arms being spaced corresponding to the spacing of said areas, transfer drive means for moving said transfer arms back and forth in a direction parallel with said top surface and dwelling above successive ones of said areas, a plurality of friction clamp elements carried by said transfer arms, and operating means for bringing said friction clamp elements into engagement with a fabric workpiece for sliding the workpiece over said top surface from one area to the next area.

20. Apparatus for automatically transferring a plurality of fabric workpieces as claimed in claim 19 and wherein one of said areas includes movable platform means, and additional clamp means for holding a workpiece on said movable platform means.

21. A method of registering a fabric workpiece to bring an edge of said workpiece into an accurately known location comprising the steps of providing a movable stop surface defining said known location, said stop surface being adapted to engage the edge of the workpiece, providing a work-supporting surface upon which the workpiece is readily slidable, initially positioning said movable stop surface away from said work-supporting surface, moving said movable stop surface down adjacent to said work-supporting surface, moving the workpiece onto said supporting surface initially with its said edge generally oriented toward said stop surface and offset from said stop surface, applying brief force impulses urging the workpiece to move toward said stop surface, said edge engaging said stop surface for bringing said edge into accurately known location, and raising said movable stop surface away from said work supporting surface after said workpiece has been registered thereagainst.

22. A method of registering a fabric workpiece to bring a corner and adjacent edges into an accurately known location comprising the steps of providing a pair of movable stop surfaces having contours matching a pair of adjacent edges of said workpiece defining said corner, providing a work-supporting surface on which the workpiece is readily slidable, initially positioning said movable stop surfaces away from said work-supporting surface, moving said movable stop surfaces down adjacent to said work-supporting surface, applying a first plurality of brief force impulses to said workpiece impelling said workpiece to move edgewise toward one stop surface of said pair of stop surfaces, applying another plurality of brief force impulses and raising said movable stop surfaces away from said work-supporting surface after said workpiece has been registered thereagainst to said workpiece impelling said workpiece to move edgewise toward the other stop surface of said pair of stop surfaces, the brief force impulses of the first plurality alternating with the brief force impulses of the other plurality moving said workpiece to cause said pair of edges to abut said respective stop surfaces, and raising said movable stop surfaces away from said work-supporting surface after said workpiece has been registered thereagainst.

23. Apparatus for registering a fabric workpiece comprising table means having a supporting surface for supporting the fabric workpiece to be registered, said supporting surface having a low sliding friction with the workpiece, stop means positioned above said supporting surface movable down toward said surface, means for changing the spacing between said stop means and said supporting surface for bringing the workpiece into operative relationship with said stop means, and impulse applying means including a plurality of rotatable beaters having resilient deflectable beating fingers for applying intermittent impulses to said workpiece for impelling said workpiece toward said stop means, and second means for changing the spacing between said stop means and said supporting surface for engaging the workpiece with said rotatable beaters.

24. Apparatus for registering a fabric workpiece comprising table means having a supporting surface for supporting a fabric workpiece to be registered, said supporting surface permitting the workpiece to slide thereon, stop means for engaging an edge of the workpiece, impulse applying means for applying a plurality of impulses to the workpiece directed toward said stop means for sliding the workpiece over said supporting surface toward said stop means, and means for preventing the workpiece from rising up from said supporting surface including a top plate closely spaced above said supporting surface and extending over the workpiece.

25. Apparatus for registering a fabric workpiece comprising table means having a supporting surface for supporting the fabric workpiece to be registered, said supporting surface permitting the workpiece to slide thereon, stop means for engaging an edge of the workpiece impulse applying means for applying a plurality of impulses to the workpiece directed toward said stop means for sliding the workpiece over said supporting surface toward said stop means, and means for preventing the workpiece from rising up from said supporting surface including air flow apparatus creating a flow of air downwardly toward the workpiece.

26. Apparatus for registering a fabric workpiece comprising support table means for supporting the fabric workpiece, said table means having a smooth stationary top surface with a small coefficient of sliding friction allowing the workpiece to be slid thereon, said top surface having a plurality of openings therein, stop means for engaging an edge of the workpiece, impulse applying means for applying a plurality of brief force impulses to the workpiece directed toward said stop means for sliding the fabric workpiece along said stationary top surface until an edge engages against said stop means, said impulse applying means including a plurality of rotatable members engageable with the workpiece for urging the workpiece toward said stop means by brief, gentle impulses, said rotatable members engaging the fabric workpiece through said openings, and means creating an air flow toward said rotatable members for increasing the frictional engagement between the lower surface of the workpiece and said rotatable members.

27. Apparatus for registering a fabric workpiece having a corner with two edges adjacent to the corner comprising table means having a supporting surface for supporting the fabric workpiece to be registered, said supporting surface being adapted to have the workpiece slid thereon, first stop means having a contour matching the contour of a first of said edges, second stop means having a contour matching the contour of the second of said edges, first and second impulse applying means spaced relative to one another to engage the workpiece along its respective margins adjacent to said first and second edges, respectively, said first impulse applying means applying intermittent force impulses to the first margin directed toward said first stop means, and said second impulse applying means applying intermittent force impulses to the second margin directed toward said second stop means during intervals between the applications of said impulses by said first impulse applying means.